United States Patent
Mangiapane et al.

(10) Patent No.: US 8,016,651 B2
(45) Date of Patent: Sep. 13, 2011

(54) IN-MOLDED VENTURI FOR A VEHICLE HVAC SYSTEM

(75) Inventors: Duane Mangiapane, Dearborn, MI (US); Bryan Pepper, Livonia, MI (US); John Thomas, Ann Arbor, MI (US)

(73) Assignee: Automotive Components Holdings, LLC, Dearborn, MI (US)

( * ) Notice: Subject to any disclaimer, the term of this patent is extended or adjusted under 35 U.S.C. 154(b) by 328 days.

(21) Appl. No.: 12/019,664

(22) Filed: Jan. 25, 2008

(65) Prior Publication Data

US 2009/0188329 A1 Jul. 30, 2009

(51) Int. Cl.
*B60H 1/24* (2006.01)
(52) U.S. Cl. .......................... 454/139; 454/69
(58) Field of Classification Search .............. 454/69
See application file for complete search history.

(56) References Cited

U.S. PATENT DOCUMENTS

| | | | | |
|---|---|---|---|---|
| 3,768,394 A | * | 10/1973 | Powlesland | 454/188 |
| 4,448,111 A | * | 5/1984 | Doherty | 454/256 |
| 5,167,273 A | * | 12/1992 | Terry et al. | 165/271 |
| 6,213,867 B1 * | | 4/2001 | Yazici et al. | 454/263 |
| 6,378,317 B1 * | | 4/2002 | Ribo | 62/186 |
| 6,397,930 B1 * | | 6/2002 | Sterner | 165/80.3 |
| 2002/0077058 A1 * | | 6/2002 | Kossak et al. | 454/156 |
| 2010/0323602 A1 * | | 12/2010 | Suematsu et al. | 454/157 |

* cited by examiner

*Primary Examiner* — Steven B McAllister
*Assistant Examiner* — Samantha Miller
(74) *Attorney, Agent, or Firm* — MacMillan, Sobanski & Todd, LLC

(57) ABSTRACT

A is provided for aspirating air in a HVAC module assembly having a first HVAC module housing section including a first venturi portion. A second HVAC module housing section includes a second venturi portion. The first and second HVAC module housing sections form a HVAC mixing chamber and venturi chamber. The first venturi portion mates with the second venturi portion to cooperatively form the chamber.

13 Claims, 4 Drawing Sheets

IN-MOLDED VENTURI FOR A VEHICLE HVAC SYSTEM

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISC APPENDIX

Not Applicable

BACKGROUND OF THE INVENTION

1. Field of Invention

This invention relates in general to vehicle air conditioning systems, and in particular to an in-molded venturi of a vehicle air conditioning system.

2. Background of Related Art

In vehicle heating, ventilation and air conditioning (HVAC) systems, a temperature sensor may be disposed within the interior of the vehicle, sensing the temperature of the interior of the vehicle. The sensor is in pneumatic communication with a HVAC module assembly via a tubular member. The tubular member has one end coupled to the sensor and the other end coupled to a valve for creating a vacuum for drawing air through the sensor from the passenger compartment.

The valve and tubular member are separate components from the HVAC module assembly and the valve is mechanically coupled to the HVAC module assembly. The mechanical coupling is accomplished by snapping the valve into an opening or by other mechanical means such as fasteners, which generally requires the valve be attached to the HVAC module assembly at a substantially planar surface. That is, it is desirable to attach the valve on a surface that is substantially planar so that the valve seats and seals properly at its point of connection. However, this limits the optimal positioning of the valve since the profile of the HVAC module assembly changes shape regularly so that it can be configured to the underside of the instrument panel and to avoid interference with other surrounding components. Furthermore, having to position the valve at a substantially planar region of the HVAC module assembly may position the valve in an area of turbulence which will lessen the vacuum drawing air past the valve.

Moreover, damage or loosening of the valve may arise during assembly as a result of the mechanical connection (e.g., snap fit connection) as the valve may become unseated or unsecured during the assembly and handling of the HVAC module assembly.

BRIEF SUMMARY OF THE INVENTION

The present invention has the advantage of providing a venturi valve that is integrally formed as part of the molded sections of the HVAC module assembly which allows the venturi valve to be formed at a location that is optimum for creating a vacuum in the venture whether the location is a planar or non-planar surface.

In one aspect of the present invention, a venturi is provided for aspirating air in a HVAC module assembly having a first HVAC module housing section including a first venturi portion. A second HVAC module housing section includes a second venturi portion. The first and second HVAC module housing sections form a HVAC mixing chamber and venturi chamber. The first venturi portion mates with the second venturi portion to cooperatively form the venturi chamber.

In one aspect of the present invention, a HVAC system is provided for a vehicle. The HVAC system includes a HVAC module assembly comprising a first HVAC module housing section having a first venturi portion. A second HVAC module housing section includes a second venturi portion. The first and second HVAC module housing sections form a HVAC mixing chamber and venturi chamber. The first venturi portion mates with the second venturi portion to cooperatively form the venturi chamber. The first venturi portion and the second venturi portion cooperatively form an air flow opening between the HVAC mixing chamber and the venturi chamber for allowing air flow from the HVAC mixing chamber to the venturi chamber. A sensor disposed within an interior compartment of the vehicle measures a temperature of the interior compartment. The sensor is in fluid communication with the venturi chamber. Forced air from the HVAC mixing chamber to the venturi chamber generates a vacuum within the venturi chamber from the sensor. The vacuum generates air flow from the interior compartment through the sensor for measuring the temperature of the interior compartment of the vehicle.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
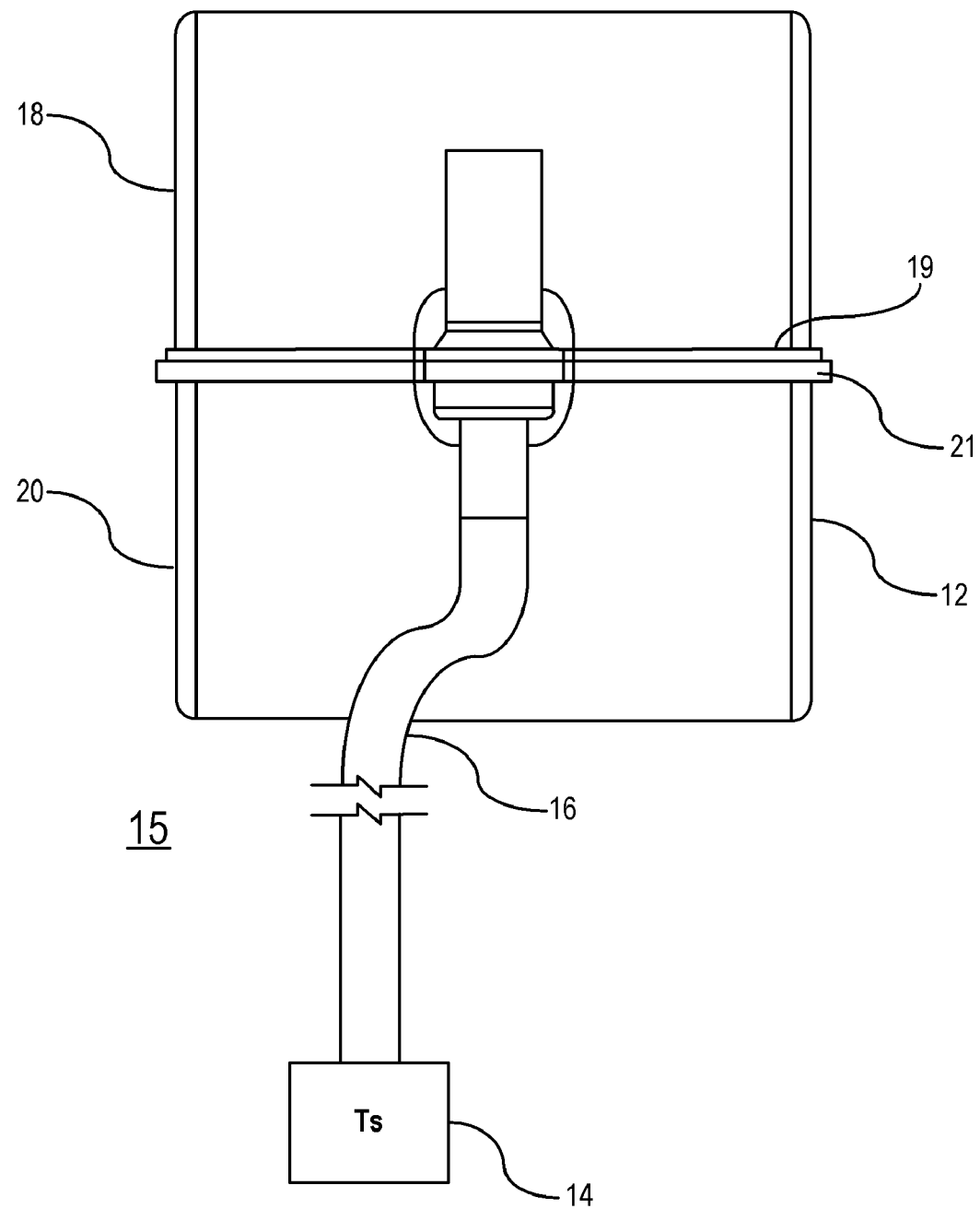
FIG. 1 is a partially schematic, front view of a HVAC module assembly of the present invention.

Referring now to the drawings, there is illustrated in FIG. 1 a HVAC system 10 for a vehicle. The HVAC system 10 includes a HVAC module assembly 12 coupled to a temperature sensor 14 for measuring the interior temperature of a vehicle's passenger compartment 15. The sensor 14 may be positioned remote from the HVAC module assembly 12 and be pneumatically coupled to the HVAC module assembly 12 by a tubular member 16.

Figure 2:
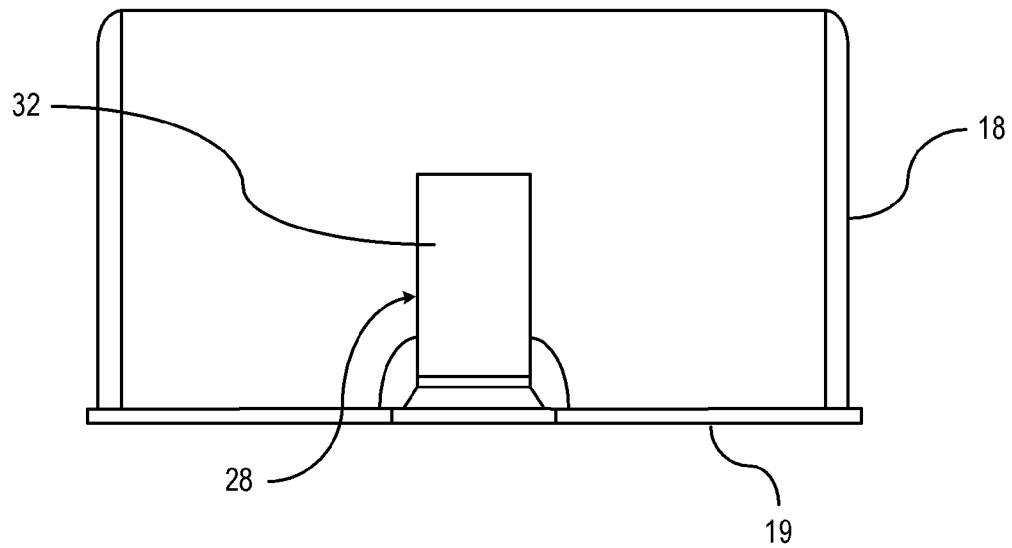
FIG. 2 is an upper housing section of the HVAC module assembly of the present invention.
Figure 3:
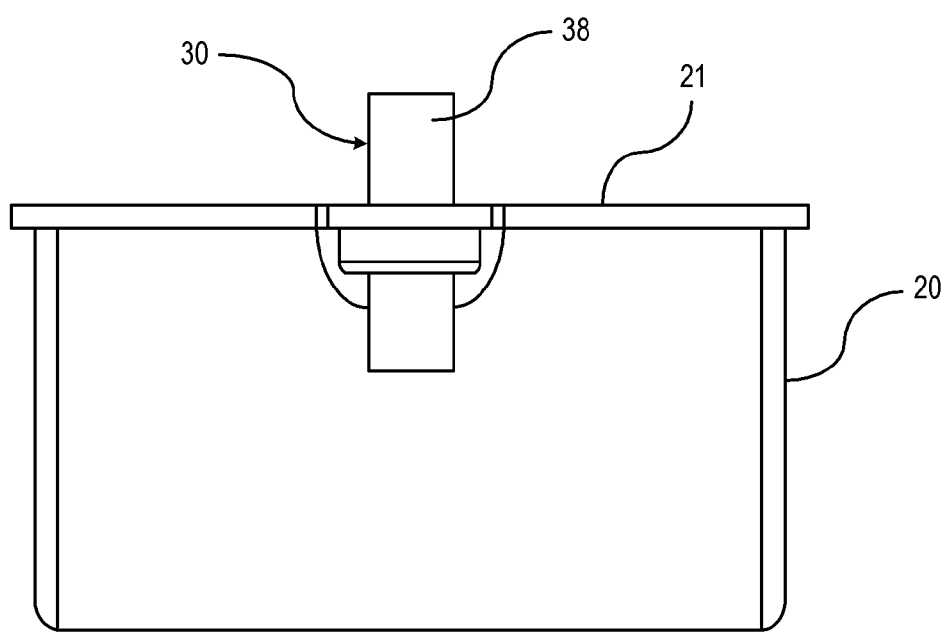
FIG. 3 is a lower housing section of the HVAC module assembly of the present invention.

Referring to FIGS. 1-3, the HVAC module assembly 12 includes first HVAC module housing section 18 and a second HVAC module housing section 20. The first housing section 18 and second housing section 20 are each formed by a molding operation (e.g., injection molding). The first housing section 18 includes a coupling surface 19. The second housing section 20 includes a coupling surface 21. The first housing section 18 and the second housing section 20 are coupled together to form the housing for the HVAC module assembly 12. The coupling surfaces 19 and 21 form a lip and slot-type of coupling to seat the first housing section 18 against the second housing section 20. Alternatively, the first and second housing sections 18 and 20 may be coupled together by fasteners, stakes, or a welding process.

Figure 4:
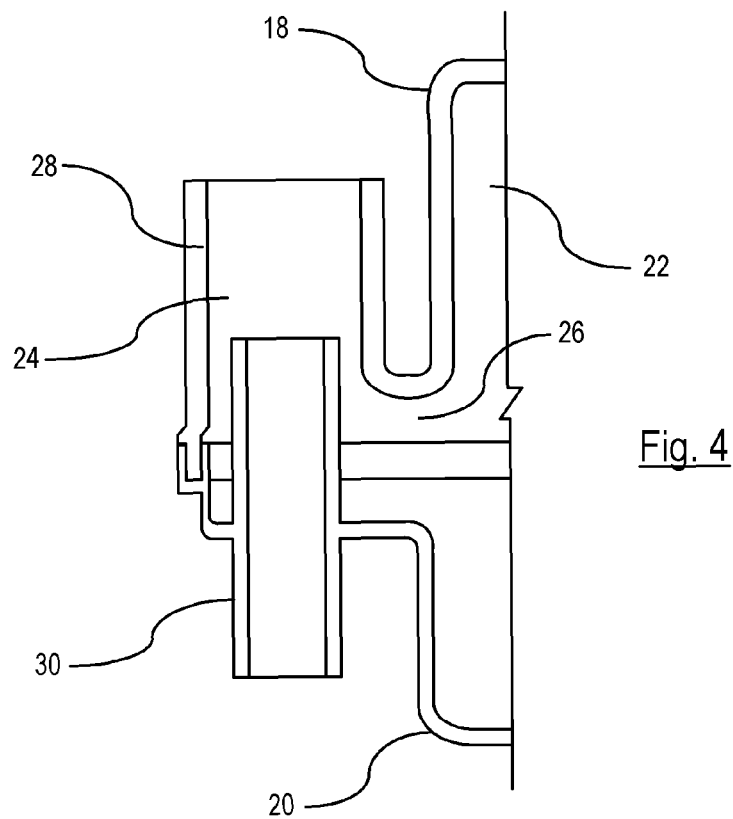
FIG. 4 is a cross section of the venturi of the HVAC module assembly of the present invention.

The interior of the HVAC module assembly 12 includes a HVAC mixing chamber 22 and a venturi chamber 24 as shown in FIG. 4. An opening 26 is formed between the HVAC mixing chamber 22 and the venturi chamber 24 for allowing air flow between the HVAC mixing chamber 22 and the venturi chamber 24. The HVAC mixing chamber 22, in addition to supplying forced air to the venture chamber 24, combines forced air with conditioned air which is output to various ducts and register vents of the vehicle.

Figure 5:
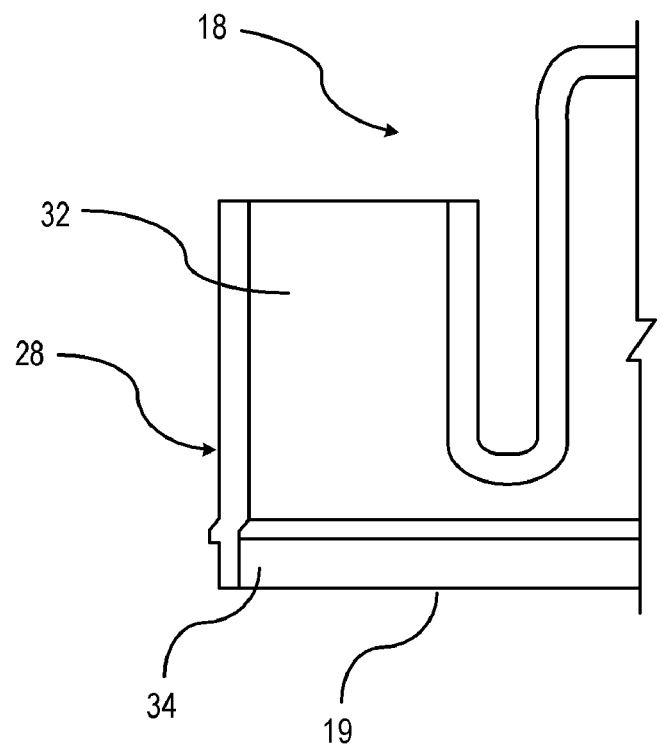
FIG. 5 is a cross section of a first venturi section of the HVAC module assembly of the present invention.
Figure 6:
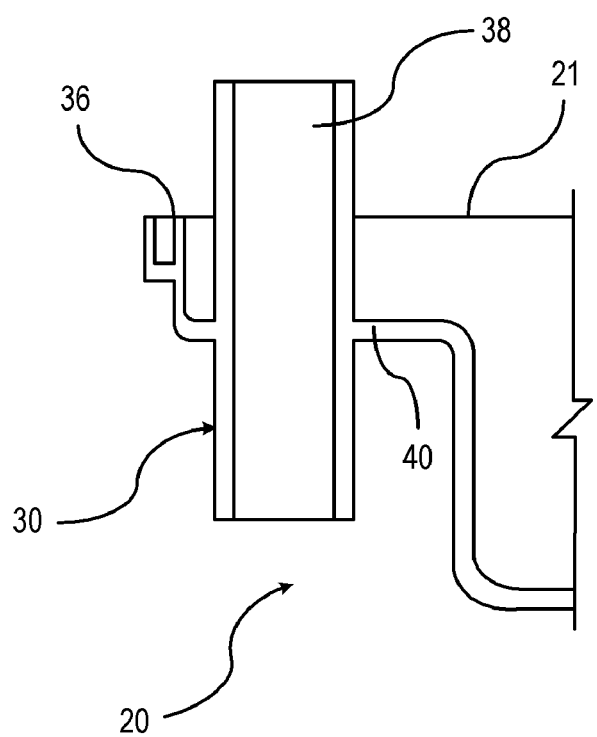
FIG. 6 is a cross section of a second venturi section of the HVAC module assembly of the present invention.

The venturi chamber 24 is formed by a first venturi portion 28, shown in FIG. 5, and a second venturi portion 30, shown in FIG. 6. The first venturi portion 28 is molded as part of the first housing section 18. The second venturi portion 30 is molded as part of the second housing section 20.

The first venturi portion 28 includes a first passageway 32 having a cross-section area normal to the longitudinal air flow of the first passageway 32. An end of the first passageway 32 is formed by an edge section 34 of the coupling surface 19 of the first housing section 18. The first passageway 32 extends a predetermined distance in a longitudinal direction away from the coupling surface 19 and away from the second housing section 20, and is in fluid communication with the vehicle interior for allowing the discharge of air flow from the venturi chamber 24.

The second venturi portion 30 includes an edge section 36 that couples to the edge section 34 of the coupling surface 19 for forming the venturi chamber 24. A second passageway 38 is formed in the second venturi portion 30. The second passageway 38 is integrally formed through a wall section 40 of the second housing section 20 and is disposed radially inward from the coupling surface 36. The second passageway 38 extends a first distance below wall section 40 away from the first housing section 18 for coupling to the conduit 16. In addition, the second passageway 38 extends in an opposing longitudinal direction above an imaginary plane of the coupling surface 36. The second passageway 38 extending above the imaginary plane of the coupling surface 36 has a cross section area normal to the longitudinal air flow of the second passageway 38.

The cross-section area of the second passageway 38 is smaller than the cross-section area of first passageway 32 such that the second passageway 38 telescopically extends a predetermined distance into the first passageway 32 when the first housing section 18 is coupled to the second housing section 20. The positioning of the second passageway 38 within the first passageway 32 forms a respective flow path between an inner wall of the first passageway 32 and an outer wall of the second passageway 38. Preferably, the second passageway 38 is substantially concentric to the first passageway 32. Alternatively, the second passageway 38 may be axially offset from the first passageway 32.

Figure 7:
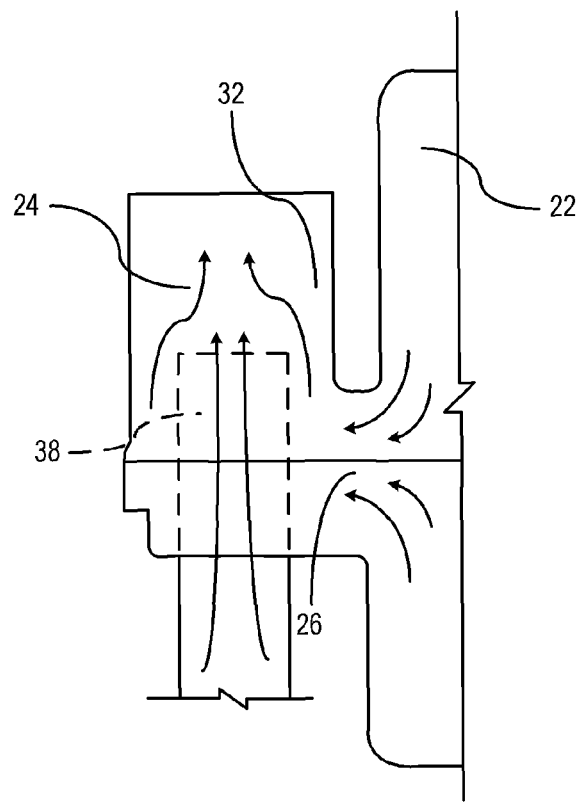
FIG. 7 is a schematic illustration of the air flow paths of the HVAC module assembly of the present invention.

FIG. 7 illustrates the flow paths of first and second passageways 32 and 38 for generating a venturi effect. Forced air generated within the HVAC mixing chamber 22 is directed through the opening 26 and into the venturi chamber 24. That is, the forced air flows from the opening 26 and into the first passageway 32 and past the opening of the second passageway 38. The air flow past the opening of the second passageway 38 generates a vacuum over the opening of the second passageway 38. The vacuum draws air from the interior of a passenger compartment, through the sensor 14 and conduit 16 (as shown in FIG. 1), through the second passageway 38 and the first passageway 32, and exiting the venturi chamber 24. The temperature of the air flowing through the sensor 14 is measured.

The integrally molded venturi chamber allows the venturi to be positioned at substantially any parting line location on the of the HVAC module assembly which provides the optimum results for creating a vacuum or for packaging locations. For example, a valve snapped on to the HVAC module assembly would require it be coupled to a flat portion of the housing so that the valve seats securely against the housing. In the present invention, by molding the venturi as part of the housing, the venturi may be integrally molded in areas that are either planar or non-planar. The valve would avoid any disadvantages of not being securely fastened to the housing as discussed above. Moreover, the valve could be molded at those areas that provide the optimum results for generating a vacuum.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A vehicle HVAC module assembly for aspirating air from an interior vehicle passenger compartment of a vehicle, the vehicle HVAC module assembly comprising:
a first HVAC module housing section including a first coupling surface, the first HVAC module housing section further including a first portion formed about the first coupling surface; and
a second HVAC module housing section including a second coupling surface, the second HVAC housing section module further including a second portion formed about the second coupling surface, the second portion is in fluid communication with the interior vehicle passenger compartment of the vehicle, the first and second HVAC module housing sections forming a HVAC mixing chamber within the vehicle by a coupling of the first and second coupling surfaces wherein the first coupling surface is seated against the second coupling surface, the HVAC mixing chamber mixing forced air and conditioned air therein, and wherein the first coupling surface at the first portion mates with the second coupling surface at the second portion to cooperatively form a vacuum chamber that draws air from the interior vehicle passenger compartment in response to the conditioned and forced air from the HVAC mixing chamber flowing through the vacuum chamber.

2. The vehicle HVAC module assembly of claim 1 wherein the first portion includes a first flow passage of a first cross-section and the second portion includes a second flow passage of a second cross-section smaller than the first cross-section, the second flow passage extending into the first flow passage.

3. The vehicle HVAC module assembly of claim 2 wherein the second portion is substantially concentric to the first portion.

4. The vehicle HVAC module assembly of claim 2 wherein the first portion and the second portion cooperatively form an air flow opening between the HVAC mixing chamber and the vacuum chamber for allowing air flow from the HVAC mixing chamber to the vacuum chamber, and wherein air flowing through the opening and exiting the first flow passage generates a vacuum for the air flowing through the second flow passage.

5. The vehicle HVAC module assembly of claim 2 wherein the first HVAC module housing section including the first portion is a single piece molded component.

6. The vehicle HVAC module assembly of claim 2 wherein the second HVAC module housing section including the second portion is a single piece molded component.

7. A HVAC system for a vehicle comprising:
a HVAC module assembly comprising:
a first HVAC module housing section including a first portion; and
a second HVAC module housing section including a second portion, the first and second HVAC module housing sections forming a HVAC mixing chamber and vacuum chamber, wherein the first portion mates with the second portion to cooperatively form the vacuum chamber, and wherein the first portion and the second portion cooperatively forms an air flow opening between the HVAC mixing chamber and the vacuum chamber for allowing air flow from the HVAC mixing chamber to the vacuum chamber;
a sensor disposed within an interior compartment of the vehicle for measuring a temperature of the interior compartment, the sensor being in fluid communication with the vacuum chamber; and
wherein forced air from the HVAC mixing chamber to the vacuum chamber generates a vacuum within the vacuum chamber from the sensor, and the vacuum generates air flow from the interior compartment through the sensor for measuring the temperature of the interior compartment of the vehicle.

8. The HVAC system of claim 7 wherein the first portion includes a first flow passage of a first cross-section and the second portion includes a second flow passage of a second cross-section, the second cross-section being smaller than the first cross section, the second flow passage extending into the first flow passage, wherein the air flow from the opening to the first flow passage generates the vacuum within the second flow passage.

9. The HVAC system of claim 8 wherein the second portion is substantially concentric to the first portion.

10. The HVAC system of claim 7 further comprising a conduit for coupling the sensor to the HVAC module assembly.

11. The HVAC system of claim 7 wherein the first HVAC module housing section including the first portion is a single piece molded component.

12. The HVAC system of claim 7 wherein the second HVAC module housing section including the second portion is a single piece molded component.

13. The HVAC system of claim 7 wherein the first HVAC module housing section including the first portion is coupled to the second HVAC module housing section including the second portion for forming the HVAC module assembly.

* * * * *